UNITED STATES PATENT OFFICE.

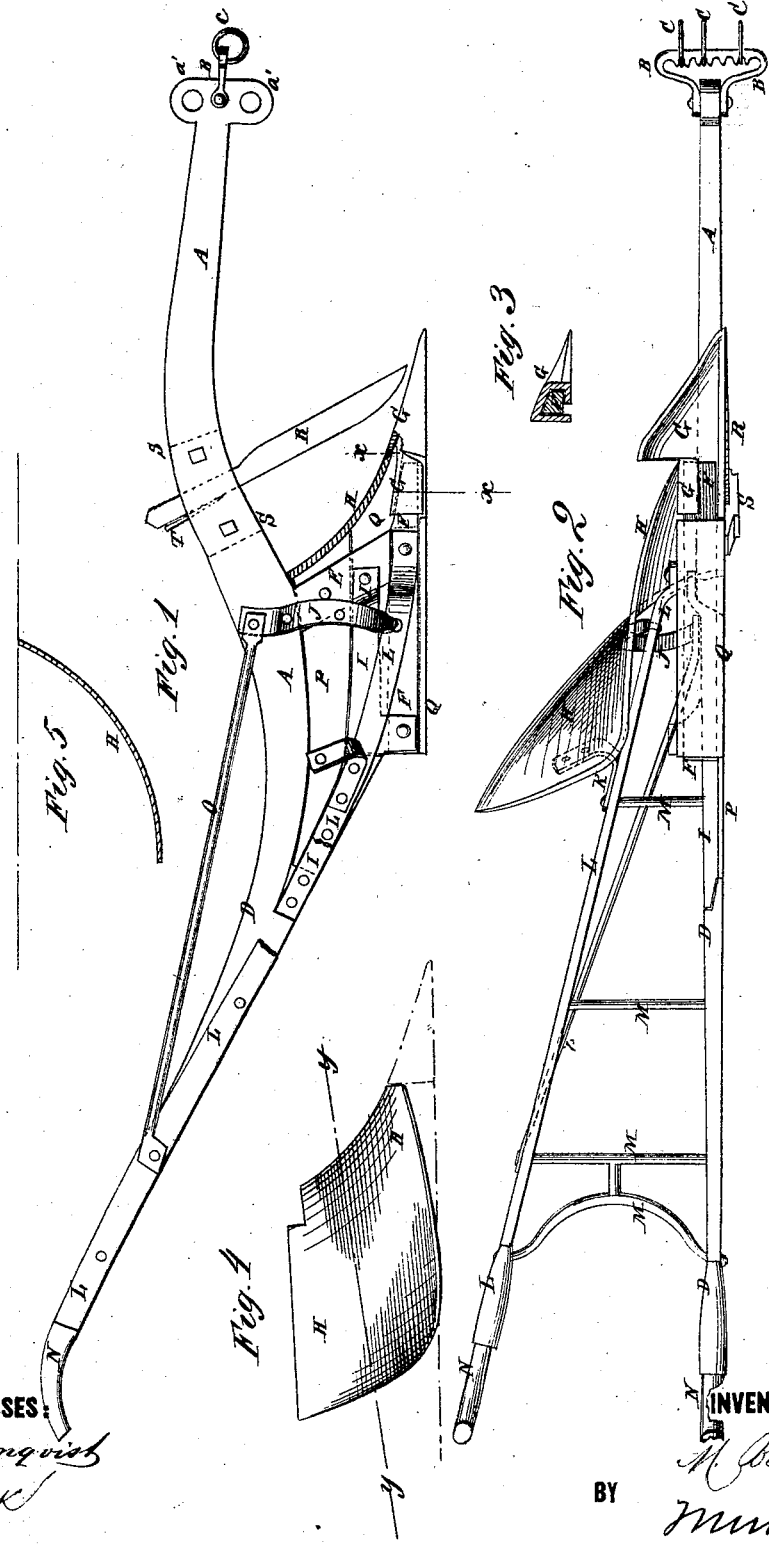

MICHAEL BARRY, OF VALPARAISO, INDIANA.

IMPROVEMENT IN PLOWS.

Specification forming part of Letters Patent No. 151,744, dated June 9, 1874; application filed March 14, 1874.

*To all whom it may concern:*

Be it known that I, MICHAEL BARRY, of Valparaiso, in the county of Porter and State of Indiana, have invented a new and useful Improvement in Plows, of which the following is a specification:

Figure 1 is a side view of my improved plow, the mold-board and part of the mold-board handle being broken away to show the construction. Fig. 2 is a bottom view of the same. Fig. 3 is a cross-section of the share, socket, and head-iron, taken through the line $x\ x$, Fig. 1. Fig. 4 is a detail side view of the mold-board. Fig. 5 is a detail section of the same, taken through the line $y\ y$, Fig. 4.

Similar letters of reference indicate corresponding parts.

The invention consists in certain improvements in plows, as hereinafter described, and specifically indicated in the claims.

A is the beam, upon the forward end of which is formed a vertical cross-head, $a'$, in which are formed three or more holes to receive the pin of the clevis B, so that by changing the said clevis-pin from one to another of said holes, the point of draft attachment can be changed to cause the plow to run deeper or shallower in the ground, as may be required. The clevis B is made wide, as shown in Fig. 2, and has several notches formed in its front bar to receive the rings or links C, so that the point of draft attachment can be readily adjusted to cause the plow to cut a wider or narrower furrow, as may be desired. The plow-beam A is extended to the rearward, and is curved upward to form the land-side handle D. Upon the beam A is formed, or to it is attached, the upper end of the standard E, the lower end of which is halved and bolted to the head F. The forward end of the head F fits into a socket formed upon the base of the share G, which share G is kept in place without any other fastening. H is the mold-board, which is curved, as shown in Figs. 1, 2, 4, and 5, and the point or forward end of which is beveled off, and fits into a groove beneath the rear edge of the cheek of the share G, which holds it in place, prevents the said point from wear, and allows it to scour readily. I is the heel of the plow, the forward end of which is bolted to the standard E, and its rear part inclines upward, and is halved and bolted to the handle D. The rear part of the heel I has a lug formed upon it, which is bolted to the rear end of the head F. The mold-board H is secured in place by the braces J and K. The lower end of the brace J has a bolt formed upon it, which is inserted in a hole in the mold-board handle L, and its upper end is bolted to the beam A. The brace J is curved outward, and to its middle part is bolted the mold-board H. The brace K is bent at a suitable angle, and its outer part is bolted to the mold-board H, and its inner part to the mold-board handle L. The forward end of the handle L is bolted to the standard E and head F by the same bolt that secures said parts to each other. The rear part of the handle L is secured to the handle D by rounds M, to which the said handles are secured by nuts. In the upper ends of the handles D L are formed sockets, having screw-threads cut in their inner surface, into which are screwed the wooden hand-pieces N. The handles D L are further strengthened by the brace O, the forward end of which is bolted to the beam A, and its rear end is bolted to the mold-board handle L. The land-side is made in two parts, P Q, the upper part P of which is bolted to the standard E and heel I. The lower part Q of the land-side is bolted to the standard E and heel I, and its lower part is bent inward at right angles, to underlap the said head F. R is the colter, the shank of which is inserted in a socket or keeper, S, which is made the same width as the beam A. The lower part of the cavity of the socket or keeper S is made of such a size as to fit upon the shank of the colter R, and its upper part is enlarged to receive the two wedges, T, by which the said colter is secured in place adjustably.

Having thus described my invention, what I claim as new, and desire to secure by Letters Patent, is—

1. The combination of the heel I with the standard E, head F, and handle D, said parts being connected and arranged substantially as herein shown and described.

2. The combination, with the mold-board H, having the beveled point, of the share G, with socket, and the head F, said parts being arranged and fitted together as shown and described.

MICHAEL BARRY.

Witnesses:
THOMAS BARRY,
DANIEL O. DONAHOE.